Figure 9:
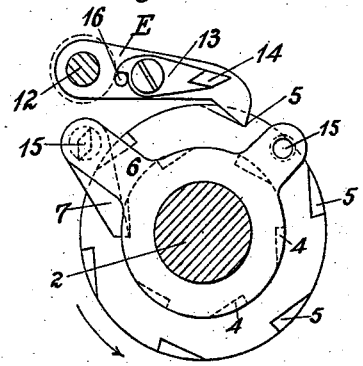

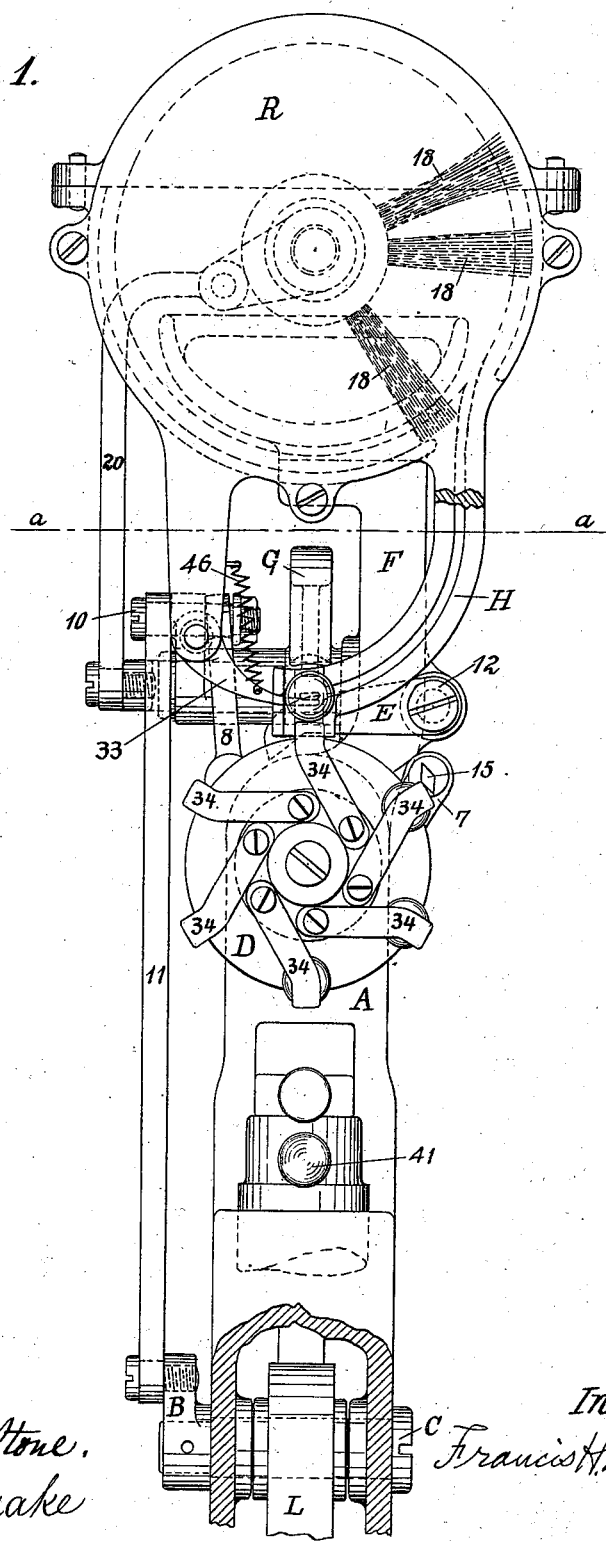

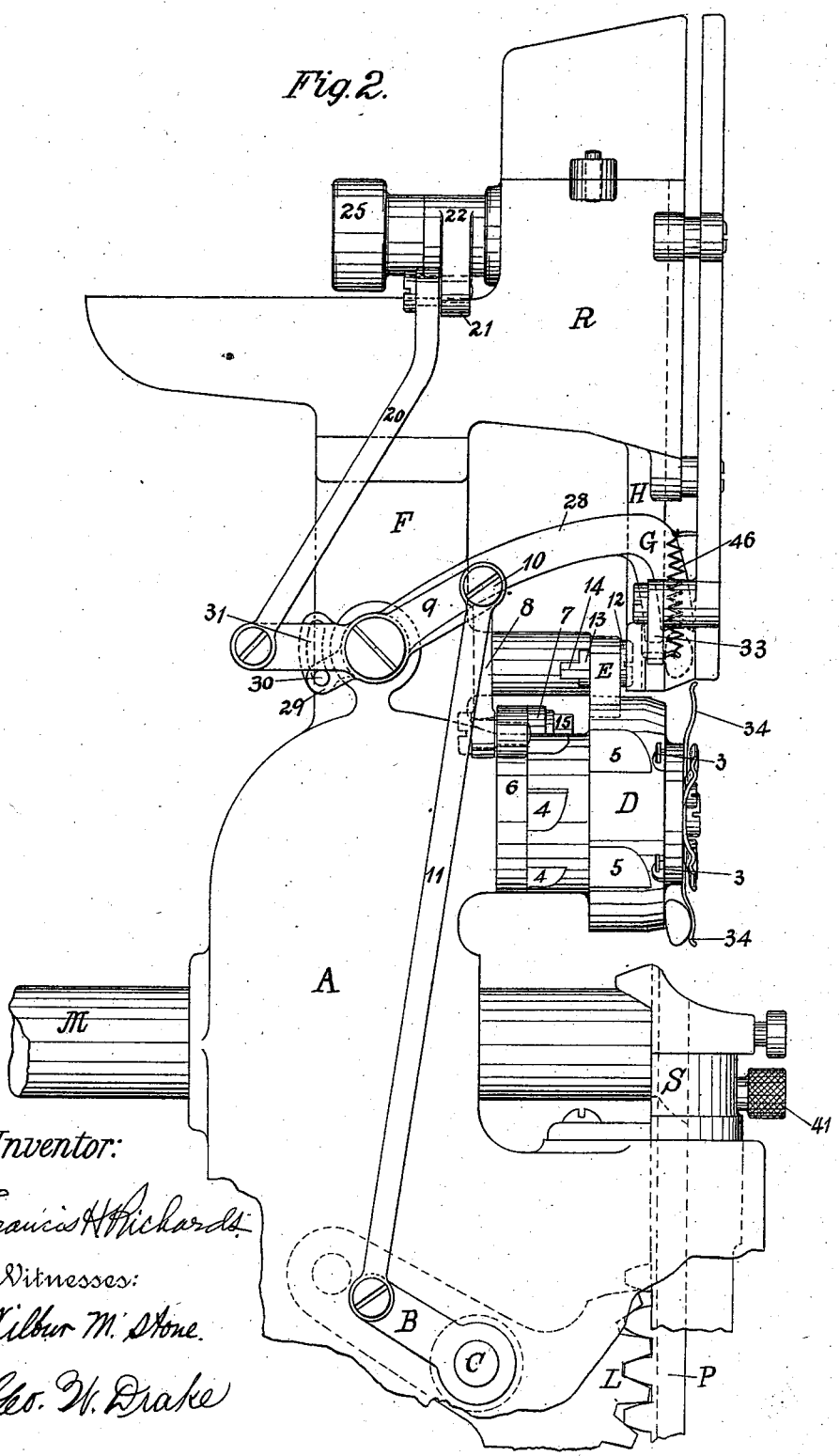

(No Model.)

7 Sheets—Sheet 3.

F. H. RICHARDS.
BUTTON SETTING MACHINE.

No. 381,030.

Patented Apr. 10, 1888.

Witnesses:
Wilbur M. Stone.
Geo. W. Drake.

Inventor:
Francis H. Richards.

(No Model.)  7 Sheets—Sheet 4.

F. H. RICHARDS.
BUTTON SETTING MACHINE.

No. 381,030.  Patented Apr. 10, 1888.

Inventor:
Francis H. Richards

Witnesses:
Wilbur M. Stone.
Geo. W. Drake (No Model.) 7 Sheets—Sheet 5.

F. H. RICHARDS.
BUTTON SETTING MACHINE.

No. 381,030. Patented Apr. 10, 1888.

Witnesses:
Wilbur M. Stone.
Geo. W. Drake.

Inventor:
Francis H. Richards (No Model.) 7 Sheets—Sheet 6.

F. H. RICHARDS.
BUTTON SETTING MACHINE.

No. 381,030. Patented Apr. 10, 1888.

Witnesses:
Wilbur M. Stone.
Geo. W. Drake.

Inventor:
Francis H. Richards (No Model.) 7 Sheets—Sheet 7.

F. H. RICHARDS.
BUTTON SETTING MACHINE.

No. 381,030. Patented Apr. 10, 1888.

Witnesses:
Wilbur M. Stone.
Geo. W. Drake.

Inventor:
Francis H. Richards.

UNITED STATES PATENT OFFICE.

FRANCIS H. RICHARDS, OF HARTFORD, ASSIGNOR TO THE AMERICAN BUTTON FASTENER COMPANY, OF NEW BRITAIN, CONNECTICUT.

BUTTON-SETTING MACHINE.

SPECIFICATION forming part of Letters Patent No. 381,030, dated April 10, 1888.

Application filed August 20, 1887. Serial No. 247,413. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Button-Setting Machines, of which the following is a specification.

This invention relates to machines for attaching buttons to shoes by means of malleable pointed metallic fasteners; and it consists in certain improvements, hereinafter more fully set forth, in that class of button-setting machines in which a series of setting-dies is carried on a revolving head above the driver.

My improvements are shown in the drawings as being applied to the button-setting machine patented to me May 4, 1886, No. 341,053, for setting the button-fasteners patented to E. Kempshall March 31, 1885, No. 314,684.

Figure 10:
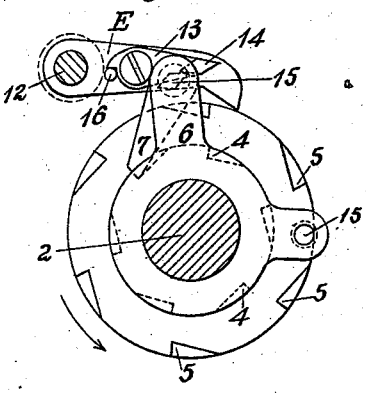
Figure 3:
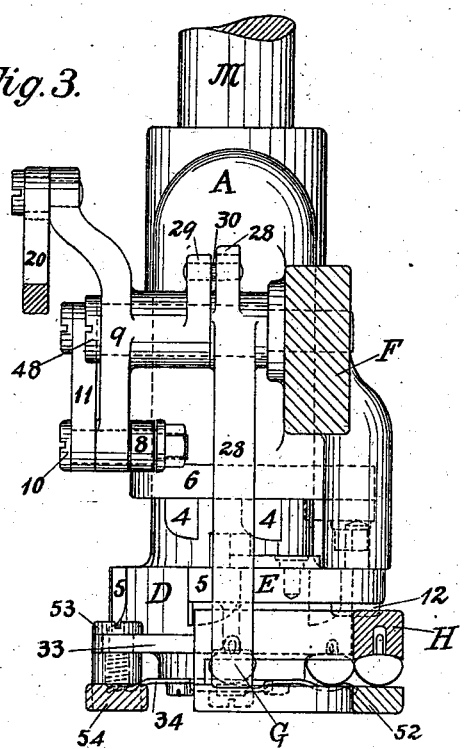
Figure 4:
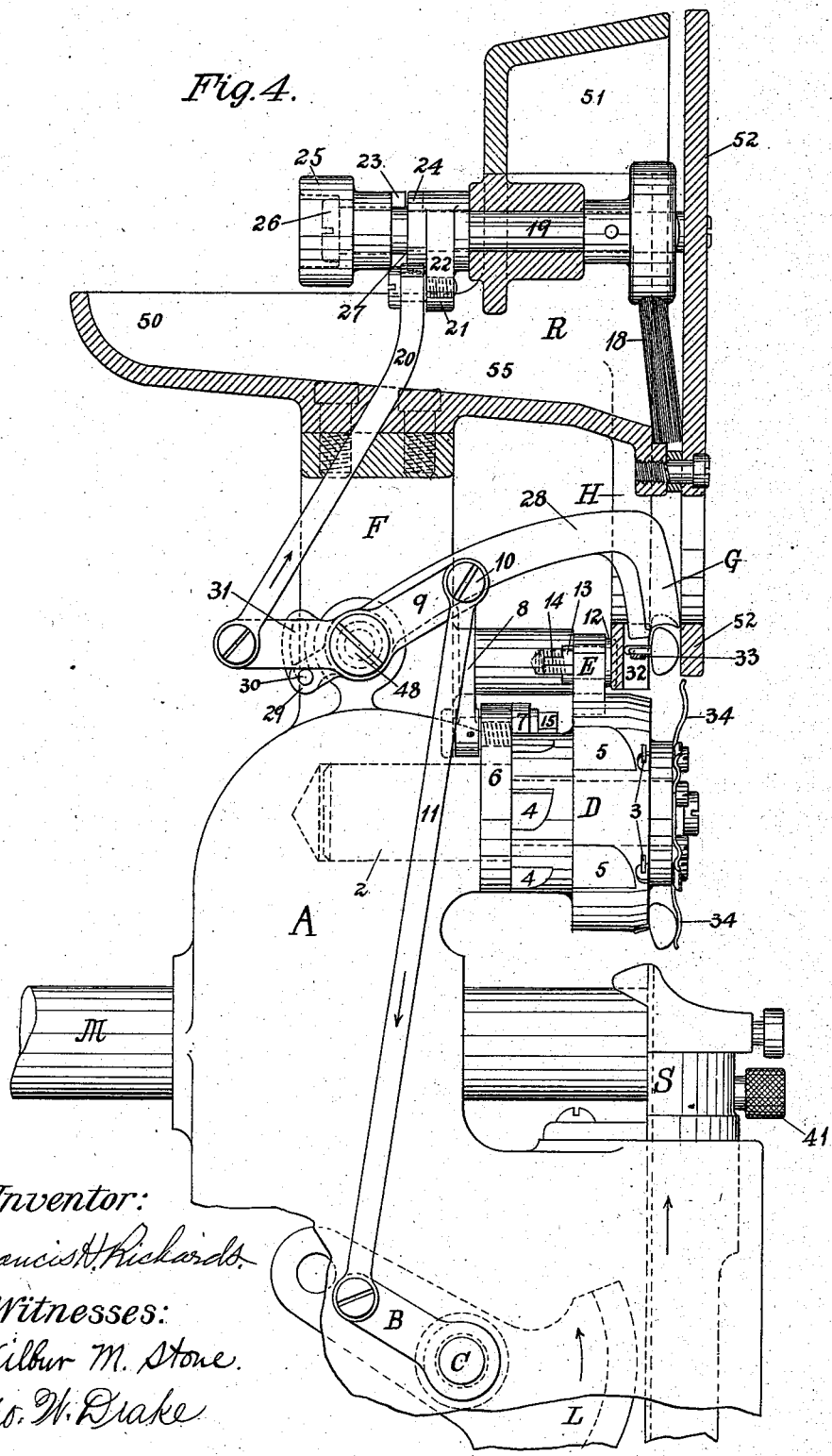
Figure 5:
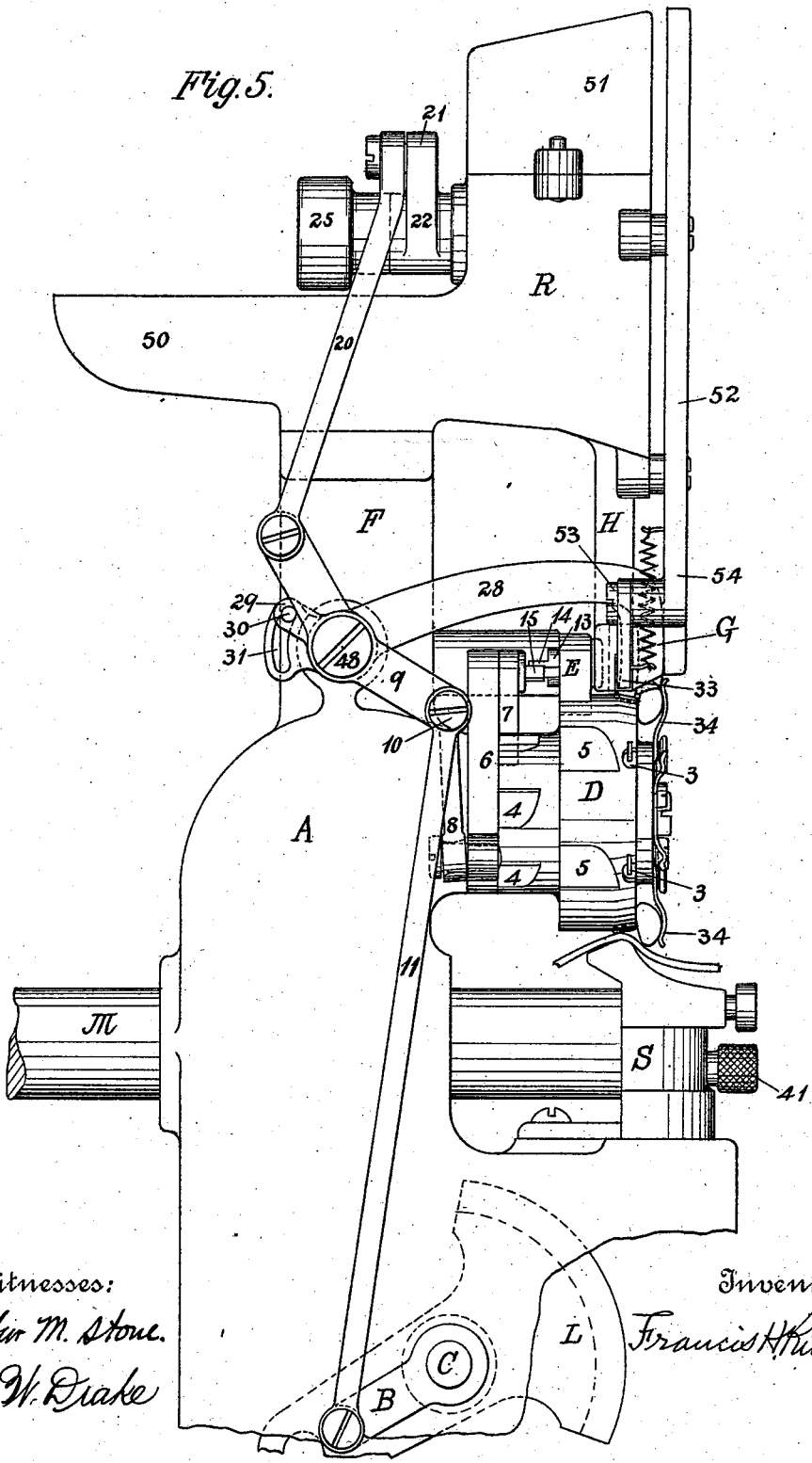
Figure 6:
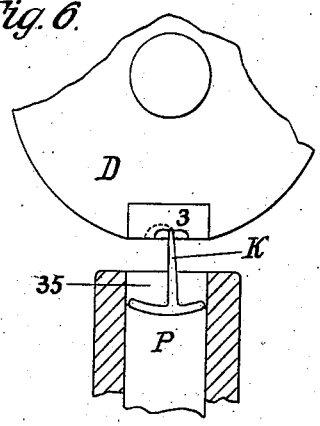
Figure 7:
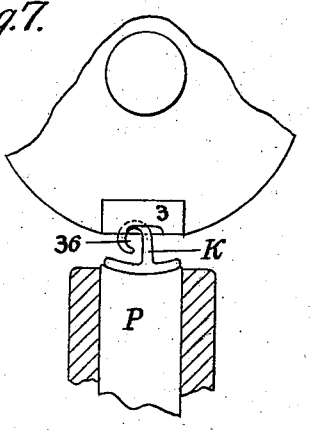
Figure 8:
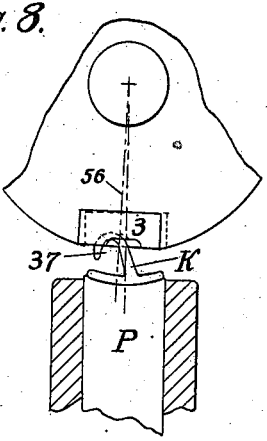
Figure 16:
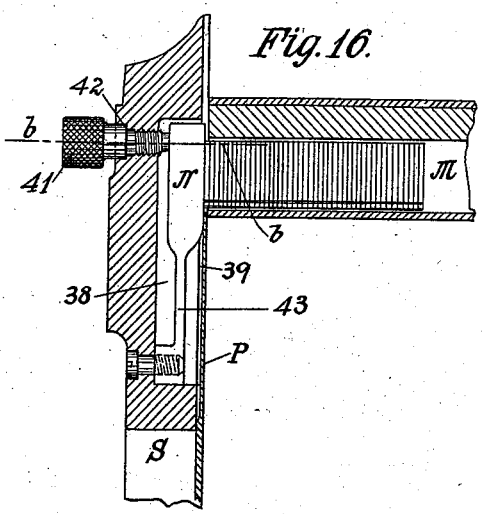
Figure 15:
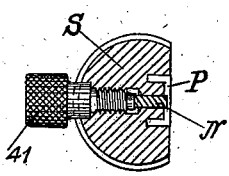
Figure 17:
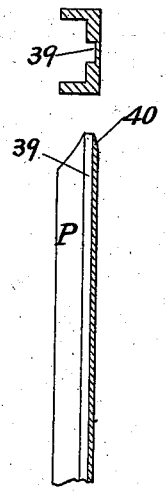
Figure 18:
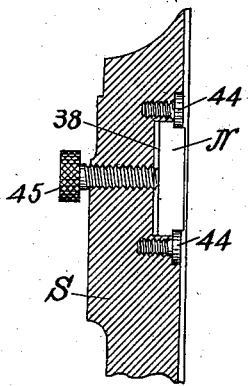
Figure 14:
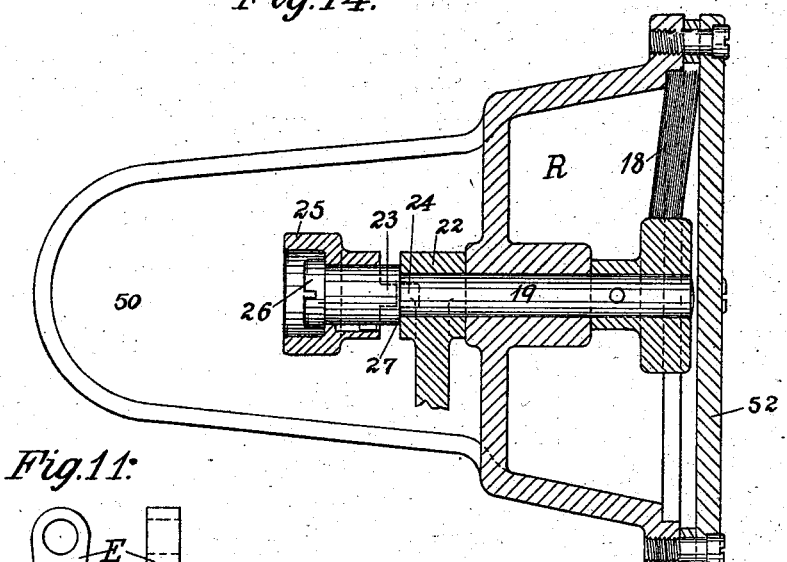
Figure 11:
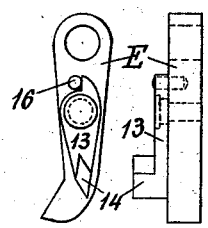
Figure 19:
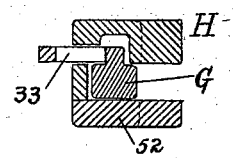
Figure 12:
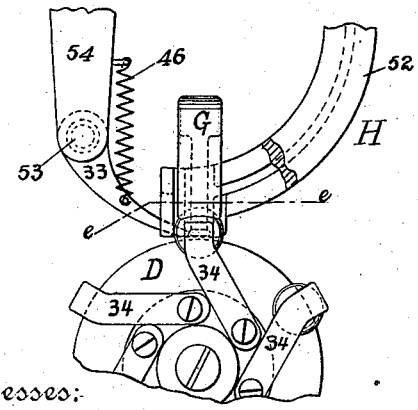
Figure 13:
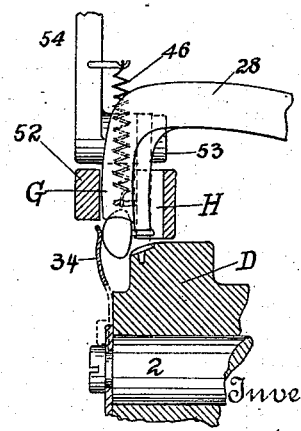

In the drawings accompanying and forming a part of this specification, Figure 1 is a front elevation of a button-setting machine embodying my improvements. Fig. 2 is a side elevation of the same as seen from the left hand in Fig. 1. Fig. 3 is a plan view, the parts above line $a\,a$, Fig. 1, being removed. Fig. 4 is a sectional side elevation, otherwise similar to Fig. 2, showing in detail certain parts of the mechanism. All the preceding figures show the machine with its parts at rest ready for operation. Fig. 5 is a partial side elevation similar to Fig. 2, illustrating the operation of certain parts of the machine. Figs. 6, 7, and 8 illustrate, on an enlarged scale, the operation of setting a fastener and the purpose of one of the important features of my improvements. Figs. 9 and 10 show in two positions the die-head feeding and locking apparatus. Fig. 11 shows by two views one form of the movable abutment arranged to operate after the manner of the ordinary swinging detent-pawl. Figs. 12 and 13 illustrate the operation of the devices which deliver the buttons to the button-carrying revolving head. Fig. 14 is a horizontal section through button-reservoir. Fig. 15 is a horizontal section through the presser-slide, above the driver 17, in line $b\,b$, Fig. 16. Fig. 16 is a vertical section through the center of the presser-slide and driver and the adjacent portion of the magazine. Fig. 17 is a detail of the driver. Fig. 18 shows a modification of the stop shown in Fig. 16. Fig. 19 is a horizontal section in line $e\,e$, Fig. 12.

Similar characters designate like parts in all the figures.

In this machine the frame A, the button-fastener magazine M, the presser-slide S and driver, and the means for operating these are or may be the same as described in my aforesaid Letters Patent. The lever L, however, has in this instance a shaft, C, fixed therein, which shaft extends outside of said frame and carries an arm, B. From this arm some suitable connections operate the revolving die-head and the button-feeding mechanism. It is, however, evident that other arrangements or devices for similarly operating said head and mechanism relating to the driver may be employed.

The die head or holder consists of a revoluble disk or wheel, D, mounted on a stud or shaft, as 2, that is supported in any convenient way by the frame of the machine. Said head carries (or has formed therein) a series of setting-dies, 3, in this instance six in number, and formed or inserted in the holder at equal distances apart and in proper alignment with the driver-channel. On its rear side the carrier or head D has ratchet notches or teeth 4, whereby it is revolved by means of a suitably-actuated pawl or the like, and has abutment notches, teeth, or stops, as 5, against which an abutment acts to lock the head D against any forward movement during the setting operation. For feeding forward the die head or carrier a feed-lever, 6, is or may be pivotally supported on the stud 2, and carries a pawl, 7, which engages with the ratchet-teeth 4 on said head. At its outer end the feed-lever is connected by a rod, 8, to the forward arm of an intermediate rocker, 9, on a stud, 10, that is actuated by another rod, 11, from the arm B on shaft C. By this means the movement of lever L within the frame to lower the driver and slide serves also to simultaneously feed forward the die-holder.

For properly limiting the forward movement of the die, and especially for resisting any such movement during the setting operation, a movable abutment, E, is pivoted at 12 to the frame and is constructed to engage with the aforesaid notches 5. This abutment, preferably a swinging one, as shown, has thereon a retracting-latch, 13, which has an incline, 14, whereby the abutment is actuated outwardly by the pin 15, fixed in the feed-lever 6. The operation of these parts is illustrated in Figs. 9 and 10. The movement of the feed-lever is somewhat greater than sixty degrees, so that the said pin 15 will strike the retracting-latch 13 and press this against the stop 16 on the abutment, and thereby swing said abutment out of engagement with its notch 5 before the feed-pawl 7 engages the ratchet for turning forward the die-holder. After this holder has begun to turn, pin 15 passes by the incline 14 of said latch 13, and thus allows the abutment E to be thrown by gravity or by a spring (not shown) into engagement again with the stops 5; and on the return of the feed-lever the pin 15 swings back and passes by the small latch 13 without moving the abutment itself.

The button-reservoir R, provided with a supply-pan, 50, opening thereinto, the loose cover 51, and front plate, 52, is supported on a bracket, F, on the main frame. The reservoir is provided with an ordinary button-chute, H, leading therefrom, and within has the usual means (as the oscillating brush 18 or other device for like purposes) for directing the buttons into said chute. This device may be carried or actuated by an oscillating shaft, 19, projecting from the reservoir and having suitably affixed thereon an arm connected by rod 20 to the rear end, 21, of the aforesaid lever 22. In practice it is convenient to operate the shaft by hand for the purpose of filling the button-chute with buttons prior to operating the machine. For this purpose I make said arm 22 to fit freely on said shaft 19 and provide the shaft with a sliding clutch splined thereto, which clutch has a pin, 23, fitting a corresponding notch, 24, in the arm. This clutch has or may have a knurled head, 25, whereby it is slid on the shaft and whereby the shaft may be conveniently operated while unclutched. A head, 26, on the shaft serves to properly limit the outward movement of the clutch, while a shoulder, 27, prevents the arm 22 from following said movement. The button-chute being filled, the clutch-knob 25 is then pushed into engagement with the arm, which will thereafter operate the brush automatically by power.

The button-chute H leads downward and laterally (unless the reservoir be located otherwise than as shown) and terminates adjacent to one of the setting-dies when the head D is in its locked position. The chute is shaped at its lower end conformably to the button-plunger described below. Directly above the setting-die, and at the end of said chute, there is a button-feeding plunger, G, which has a suitable vertically-reciprocating movement imparted thereto by some suitable means--as, for instance, by the arm 28, pivotally supported on the stud 48, fixed in the frame. This arm 28 receives its own movement from the lever or intermediate rocker, 9, which is connected to have a motion corresponding to the motion of the driver; but as this lever ordinarily moves farther than the arm the former has a pin, 30, working in a slot, 31, in the latter, whereby the normal movement is properly reduced, after a well-known manner. The upward movement of said plunger is sufficient to allow a button to slide thereunder, as in Fig. 4, and its downward movement delivers said button down to the button-carrying revolving head. When the plunger G goes up, the lower button slides down to the extreme end of the chute and stands directly above the passage-way 32 from said chute, with its shank lying flatwise on the detent 33, which is pivoted at 53 to arm 54 of plate 52. The lower end of said plunger being properly fitted to the button, the downward movement thereof simply pushes down the button, pressing down the detent by means of the button-shank, which shank, being thus held between the detent and plunger, holds the button in place until this passes behind the button-retaining spring 34 on said revolving head. On the upward or return stroke of the plunger the detent is replaced by means of some suitable spring, as 46, in time to receive the next button. In practice the aforesaid detent may be omitted; but if the buttons used are not very uniform in size and shape its employment will be found very serviceable in assisting the regular placing of the buttons on the setting-dies.

The die-head D may be provided with other means than springs 34 for holding the buttons in place without departing from my invention— as, for instance, certain button-holding jaws described in another application to be filed.

In Figs. 6, 7, and 8 there is shown the result of a proper action of the setting-die and the particular utility of the movable abutment. In Fig. 6 the setting-die 3 is shown in its correct position above the driver-channel 35 and the fastener K is shown with its point just entered said die at the beginning of the setting operation. In Fig. 7 the die has the same position as before, but the fastener is shown as having been driven up to form its prong into the usual and properly-formed button-holding hook, 36. In Fig. 8, however, it is supposed that the abutment or a well-known equivalent therefor is not used and that the setting-die is practically free to assume the lateral position naturally imparted thereto by the forcibly-updriven fastener-prong. Under these conditions it is found that the setting-die does not always remain in proper position, but will generally move off more or less toward the left hand, as shown by dotted line 56 in Fig. 8, thereby allowing the lower part of the prong to be crowded over to an inclined position and the point thereof to be bent over into an ill formed hook, 37, not at all suitable for properly holding buttons on shoes, and especially unsuitable for use on fine shoes;

and the serious difficulty here pointed out becomes even greater, according to my observations, as the fasteners are made of better quality, whereby more force is required for setting them. The abutment described herein, arranged either to swing, as herein shown, or to slide, (after a well-known manner,) effectually overcomes these objections to the use of the revolving die-head.

It is sometimes considered desirable to operate the machine without setting fasteners—as, for instance, to feed buttons to the button-carrying head D when preparing the machine for use—and to do this without removing the magazine M. For this purpose I have devised a movable stop carried in the presser-slide, whereby the fasteners may be held back in the magazine and not be allowed to enter the driver-channel. This stop consists of a small piece, N, laid into a groove, 38, cut in said slide in front of the driver. Corresponding to this groove there is another groove, 39, cut into and nearly through the driver, into which latter groove the stop projects when in use, as in Fig. 16, the point of the driver being rounded slightly, as at 40, Fig. 17, the better to separate the fasteners. For setting the stop I prefer a screw, 41, substantially as shown, having a shoulder, 42, or other stop for preventing the binding of the driver by setting the stop too far in the groove 38 thereof. When this screw is withdrawn, the spring 43 throws the stop back into the presser-slide, thus allowing a fastener to enter the driver-channel 35, when the driver is down, of course. The stop-holding spring 43, I consider useful but not essential, since the fasteners themselves, being forwardly driven by a spring, (not shown,) will ordinarily act to force back the stop when the said stop-operating screw 41 is withdrawn. This is the mode of operation relied on with the form of stop shown in Fig. 18. In this form the stop is notched at its ends, which lie under the heads 44 of ordinary screws inserted entirely in the slide S. A plain screw, 45, forces the stop out as far as said heads permit, and when this screw is turned back the stop can itself drop back and lie entirely within its containing-groove.

The preferred construction and arrangement and the operation of the several details will have been understood from the drawings and the preceding description.

The general operation of the machine is as follows: The magazine M being properly supplied with fasteners and the button reservoir, chute, and die-head with buttons, the fabric or shoe-upper is placed, as usual, over the driver-channel. The operator by means of a treadle and connections, or otherwise, now turns lever L to move up the driver and slide S and to drive a fastener through the fabric and into the setting-die in the usual manner. During this time the rocker and connections described force down the plunger to deliver a button to the uppermost setting-die and operate the apparatus for supplying buttons to the chute. On the return of the driver this carries down the slide S, while the ratchet mechanism first retracts the abutment and turns forward the revolving head to bring another button to position over the driver-channel and to present another setting die upturned under the button-chute. At the same time the plunger is raised to allow another button to slide into position thereunder in said chute. The parts now stand in their first positions, ready for a repetition of the entire operation. As the supply of buttons in the reservoir becomes reduced, more buttons are put in the supply-pan 50, which extends rearward (or laterally, as the case may be) from said reservoir. The operation of the brush to spread the buttons sidewise naturally favors the passage of those in said pan through the opening at 55, Fig. 4, down the inclined bottom to the front plate, 52.

In a prior application, Serial No. 243,631, I have described and claimed a part of the subject-matter shown and described in this application, and it should be understood that in that part of my present invention which is specified in claim 10 of this application the fixed die, the chute leading thereto, and the revolving carrier which are shown and described in said prior application may be substituted for the revolving button-carrying die-head and the chute leading thereto that are shown and described in this application.

This improved button-setting machine is, and especially the several details thereof are, capable of modification in construction and arrangement in various ways and degrees other than the ways described, after the manner of machines in general, and within the scope and limits of my invention.

Having thus described my invention, I claim—

1. The combination, in a button-setting machine, of the driver for forcing the fastener against the setting-die, a revolving head located above the driver and carrying a series of setting-dies, means (as a ratchet apparatus or the like) operating to turn forward said head to bring said dies successively over said driver, and a movable abutment operating to lock said head against forward movement during the setting operation, substantially as described.

2. The combination, in the button-setting machine herein described, of a button-chute having a fixed position in the machine, the button-carrying revolving head, and a plunger operating to deliver the buttons from the chute to said head, all substantially as described.

3. The combination of the button-chute, the detent normally closing the passage therefrom, the movable setting-die arranged to be placed under said passage to receive the buttons therefrom, and the plunger operating to drive the buttons through said passage and past the detent onto said die, all substantially as described.

4. The combination, in a button-setting machine having a driver-channel and a reciprocating driver working therein, of the revoluble button-carrying die-head above said driver, a button-chute leading to a point adjacent to said head, a plunger arranged and operating to deliver buttons from the chute to said head, and means (as connections or the like) operating to move the plunger toward the head simultaneously with the movement of the driver toward said head, all substantially as described.

5. The combination, in a button-setting machine, of the revolving head having ratchet-notches and abutment-notches, ratchet devices operating to intermittingly feed forward said head, a movable abutment operating to limit said forward movement by striking said abutment-notches, and means (as a latch or the like device) operating to temporarily withdraw said abutment prior to the beginning of said movement, all substantially as described.

6. The combination, in a button-setting machine and with the head D thereof, of the arm 6, carrying pawl 7 and pin 15, movable abutment E, and latch 13 on said abutment, all substantially as described.

7. The combination, with the revolving head D, of the button-chute leading to a point adjacent thereto, and the plunger G, carried on the swinging arm 28, all arranged and operating substantially as described.

8. The combination, in the button-feeding mechanism of a machine, of the brush-shaft, the actuating-arm freely fitted on said shaft, and a clutch, substantially as described, for connecting and disconnecting said arm and shaft, whereby the brush may be operated by power or by hand, all substantially as described.

9. In the button-feeding mechanism of a machine, the improved button-reservoir consisting of the hopper R, provided with a brush turning on a horizontal shaft, and having the supply-pan extending therefrom and opening thereinto at a point below said shaft, all substantially as shown and described.

10. The combination, in a button setting machine, of a reciprocating driver, a revolving button-carrier (or die-head) above said driver, a button-chute conducting buttons to said carrier, (or die-head,) button-feeding devices (as an oscillating brush or the like) for supplying buttons to said chute, the intermediate rocker connected to be operated correspondingly with the driver, connections from the rocker to and operating the button-feeding devices, and connections, substantially as described, from the rocker to and operating the carrier, (or die-head,) all substantially as described.

11. The combination, in a button-setting machine, of a reciprocating driver, a revolving head above said driver, a button-chute conducting buttons to a point adjacent to said head, the intermediate rocker connected to be operated correspondingly with the driver, connections from the rocker to and operating the revolving head, a plunger constructed and arranged to deliver buttons from the chute to said head, and connections, substantially as described, from the rocker to and operating said plunger, all substantially as described.

12. The combination, in a machine of the class specified and having a revolving button-carrier, of the intermediate rocker connected to and operating said carrier, the button-plunger carried on an arm pivotally supported, substantially as described, and a slack connection, substantially as described, from said rocker to and operating said arm, all substantially as described.

13. The combination, with the magazine and with the presser-slide, of the driver having a groove, 39, and the stop N, carried in said slide, all substantially as described.

14. The combination, with slide S, of the stop N, notched at both ends, screws 44, having heads overlying said ends, and screw 45, substantially as described, and for the purpose specified.

FRANCIS H. RICHARDS.

Witnesses:
WILBUR M. STONE,
GEO. W. DRAKE.